US012412554B2

(12) United States Patent
Yamaguchi

(10) Patent No.: US 12,412,554 B2
(45) Date of Patent: Sep. 9, 2025

(54) KEY GUIDE STRUCTURE FOR KEYBOARD INSTRUMENT

(71) Applicant: KABUSHIKI KAISHA KAWAI GAKKI SEISAKUSHO, Hamamatsu (JP)

(72) Inventor: Tsutomu Yamaguchi, Hamamatsu (JP)

(73) Assignee: KABUSHIKI KAISHA KAWAI GAKKI SEISAKUSHO, Hamamatsu (JP)

( * ) Notice: Subject to any disclaimer, the term of this patent is extended or adjusted under 35 U.S.C. 154(b) by 248 days.

(21) Appl. No.: 18/473,080

(22) Filed: Sep. 22, 2023

(65) Prior Publication Data

US 2024/0112655 A1 Apr. 4, 2024

(30) Foreign Application Priority Data

Sep. 30, 2022 (JP) ................................ 2022-157245

(51) Int. Cl.
*G10H 1/34* (2006.01)

(52) U.S. Cl.
CPC .................................. *G10H 1/344* (2013.01)

(58) Field of Classification Search
CPC ...................................................... G10H 1/344
See application file for complete search history.

(56) References Cited

U.S. PATENT DOCUMENTS 5,036,743 A * 8/1991 Yamaguchi .............. G10C 3/12 84/434
5,578,782 A * 11/1996 Masubuchi .......... G10H 1/0556 84/719
5,610,352 A * 3/1997 Yamaguchi .............. G10C 3/12 84/251
8,969,698 B1 * 3/2015 Suzuki ..................... G10C 3/12 84/436
9,082,372 B2 * 7/2015 Suzuki ..................... G10C 3/12
12,136,403 B2 * 11/2024 Yamaguchi .............. G10C 3/12
12,223,934 B2 * 2/2025 Yamaguchi ............ G10H 1/346
12,315,474 B2 * 5/2025 Ichikawa ................. G10C 3/12
2024/0112660 A1 * 4/2024 Yamaguchi ............ G10H 1/346

FOREIGN PATENT DOCUMENTS

JP 2000122654 A * 4/2000

* cited by examiner

*Primary Examiner* — Robert W Horn
(74) *Attorney, Agent, or Firm* — WOMBLE BOND DICKINSON (US) LLP

(57) ABSTRACT

A key guide structure for a keyboard instrument including a plurality of keys, for guiding each of the keys being pivotally moved in accordance with depression of the key. Each key includes a rib wall provided inside the key and extending between left and right side walls of the key in a left-right direction, and two left and right guide walls provided inside the key and extending forward a predetermined length from the rib wall with a predetermined spacing therebetween in the left-right direction. The keyboard chassis includes a plurality of key guides each provided on a key-by-key basis such that each key guide protrudes upward, each key guide being inserted between the two guide walls of each associated one of the keys from below and brought into sliding contact with the two guide walls.

3 Claims, 10 Drawing Sheets

KEY GUIDE STRUCTURE FOR KEYBOARD INSTRUMENT

CROSS-REFERENCE TO RELATED APPLICATION

This application claims priority to Japanese Patent Application Number 2022-157245, filed on Sep. 30, 2022, the entire content of which is incorporated herein by reference.

BACKGROUND OF THE INVENTION

Field of the Invention

The present invention relates to a key guide structure for a keyboard instrument, which is applied to a keyboard instrument, such as an electronic piano, for guiding a key being pivotally moved in accordance with depression of the key.

Description of the Related Art

Conventionally, as a key guide structure for a keyboard instrument, there has been known, for example, one disclosed in Japanese Laid-Open Patent Publication (Kokai) No. 2000-122654 already filed by the present applicant. A keyboard device for an electronic piano to which the key guide structure is applied includes a plurality of keys each extending in a front-rear direction and having an inverted U shape in cross-section formed by a top wall and left and right side walls, and a keyboard chassis holding these keys in a state arranged side by side in a left-right direction and pivotally supporting each key by a rear end thereof. For each key, a key guide is provided on the keyboard chassis, for guiding the key being pivotally moved. Further, in this keyboard device, the keys and the keyboard chassis are both formed as molded articles made of a hard synthetic resin. Each key guide is erected below a front wall or its vicinity of a key associated with the key guide and is formed in a plate shape having a lateral width substantially equal to a distance between the left and side walls of the key.

In the above-described key guide structure, when a key is in a key-released state, an upper end of the associated key guide is engaged with the key, in a state slightly inserted into the inside of the key. When the key is depressed from this key-released state, the key guide is engaged with the key, in a state deeply inserted into the inside of the key, thereby guiding the key being pivotally moved such that the key is prevented from swinging in the left-right direction, i.e., while preventing lateral swing of the key.

However, since the above-described key is formed by molding the synthetic resin, contraction of the key during the molding sometimes causes slight inward deflection, i.e., so-called inward fall, of the left and right side walls. FIG. 11 shows an example of inward fall (indicated by white arrows in FIG. 11) of left and right side walls 61 and 61 caused at a front portion of a white key 60 extending in a front-rear direction (left-right direction in FIG. 11). When such inward fall of the side walls is caused, there is a fear that when the side walls and the key guide are in firm contact with each other, friction therebetween is increased due to the inward fall, thereby preventing smooth guiding of the key being pivotally moved. Of course, by setting a relatively large gap between each side wall of the key and the key guide, even if the above-described inward fall is caused when the key is molded, it is possible to avoid contact between the side walls of the key and the key guide or an increase in friction therebetween due to the contact. In this case, however, since the gap between each side wall of the key and the key guide is large, lateral swing of the key is liable to occur during depression of the key. For example, when glissando is performed during a musical performance, there is a fear that noise is generated by collision of two adjacent keys.

Further, in general, when performing maintenance of the keyboard device described above, a key is removed from the keyboard chassis by sliding the key forward or rearward with respect to the keyboard chassis. In the above-described conventional key guide structure, however, since a key guide for the key, of the keyboard chassis, is provided immediately rearward of a front wall of the key, it is impossible to slide the key rearward. In addition, in general, the keyboard device has a member, such as a keyslip extending in the left-right direction, which is provided immediately forward of the key. Therefore, in the keyboard device described above, to remove the key from the keyboard chassis for maintenance of the keyboard device, it is necessary to remove the member, such as the keyslip, or the whole keyboard device from the keyboard instrument, which makes maintenance work very troublesome, and time-consuming and laborious.

SUMMARY OF THE INVENTION

It is an object of the present invention to provide a key guide structure for a keyboard instrument, which is capable of preventing side walls from falling inward when a key is molded, thereby being capable of smoothly and stably guiding the key being pivotally moved, while preventing lateral swing of the key during depression thereof, and further is capable of easily disengaging the key from a key guide therefor for maintenance of the keyboard instrument.

To attain the above object, the present invention provides a key guide structure for a keyboard instrument including a plurality of keys each of which is made of a synthetic resin, and has a hollow shape extending in a front-rear direction and open downward, for being supported by an upper portion of a keyboard chassis such that the key is pivotally movable in a vertical direction, the key guide structure being configured to guide the key being pivotally moved in accordance with depression of the key, wherein each of the plurality of keys includes a rib wall provided inside the key and extending between left and right side walls of the key in the left-right direction, and two left and right guide walls provided inside the key and extending forward a predetermined length from the rib wall with a predetermined spacing therebetween in the left-right direction, and wherein the keyboard chassis includes a plurality of key guides each provided on a key-by-key basis such that each key guide protrudes upward, each key guide being inserted between the two guide walls of each associated one of the keys from below and also brought into sliding contact with the two guide walls.

According to this construction, inside each key, the rib wall is provided which extends between the left and right side walls in the left-right direction. With this rib wall, when the key is molded, it is possible to prevent the left and right side walls from falling inward in the vicinity of the rib wall. Further, each key has the two left and right guide walls provided inside, whereas inside the keyboard chassis, there are provided the plurality of key guides each inserted between the two guide walls of each associated one of the keys from below and each brought into sliding contact with the two guide walls. Since the two guide walls are formed to extend forward from the rib wall, differently from the conventional key guide structure, the key is prevented from being affected by inward fall of the side walls otherwise caused when the key is molded, whereby it is possible to maintain a predetermined distance between the two guide walls With this, since each key guide of the keyboard chassis is engaged with two guide walls of each associated one of the keys, in a state in sliding contact therewith, it is possible to smoothly and stably guide the key being pivotally moved, while preventing lateral swing of the key during depression thereof.

Preferably, the rib wall is provided at a predetermined location of a front portion of the key, and the two guide walls are provided at a predetermined distance from a front wall of the key.

According to the construction of this preferred embodiment, since the rib wall is formed at the predetermined location of the front portion of the key, and the two guide walls are provided forward of the rib wall, it is possible to smoothly guide the front portion of the key being pivotally moved. Further, the two guide walls are provided at the predetermined distance from the front wall of the key, and hence, for example, by setting the predetermined distance to e.g. a distance large enough to allow the key to slide rearward and be removed from the keyboard chassis, it is possible, when performing maintenance of the keyboard instrument, to slide the key rearward and thereby disengage the two guide walls of the key from the key guide of the keyboard chassis and easily remove the key from the keyboard chassis.

More preferably, front ends of the two guide walls are formed such that the front ends are bent in opposite directions away from each other in the left-right direction.

According to the construction of this preferred embodiment, the key having been removed from the keyboard chassis for maintenance of the keyboard instrument is mounted on the keyboard chassis as follows: First, the key is disposed on the upper portion of the keyboard chassis in a state in which the key guide of the keyboard chassis is inserted into the key from below such that the key guide is positioned forward of the two guide walls of the key. Then, the key is slid forward, whereby the key guide is positioned between the two guide walls and engaged with the guide walls in a state in sliding contact therewith. With the above-described construction, since the two guide walls are formed such that front ends thereof are bent in opposite directions away from each other in the left-right direction, the distance between the front ends of the two guide walls is made larger than a distance between respective portions of the guide walls rearward of the front ends, and therefore, when the key is slid forward after being disposed on the upper portion of the keyboard chassis, as described above, it is possible to easily position the key guide between the two guide walls, so that it is possible to efficiently mount the key on the keyboard chassis.

The above and other objects, features, and advantages of the present invention will become more apparent from the following detailed description taken in conjunction with the accompanying drawings.

BRIEF DESCRIPTION OF THE DRAWINGS

FIGS. 1A and 1B are perspective views of a part (one octave section) of a keyboard device for an electronic piano to which the present invention is applied, in which FIG. 1A shows the appearance of the keyboard device and FIG. 1B shows a state in which keys other than a white key and a black key at a left end of the keyboard device are omitted;

FIGS. 4A and 4B are perspective views of the white key and the key support mechanism therefor, in which FIG. 4A shows the white key and the key support mechanism in a connected state and FIG. 4B shows the white key and the key support mechanism in an exploded state;

FIGS. 5A and 5B are perspective views of the black key and the key support mechanism therefor, in which FIG. 5A shows the black key and the key support mechanism in a connected state and FIG. 5B shows the black key and the key support mechanism in an exploded state;

FIGS. 6A and 6B are views useful in explaining operation of the white key in the keyboard device, in which FIG. 6A shows a key-released state and FIG. 6B shows a key-depressed state;

FIGS. 7A and 7B are views useful in explaining operation of the black key in the keyboard device, in which FIG. 7A shows a key-released state and FIG. 7B shows a key-depressed state;

FIGS. 8A to 8C are views useful in explaining an essential part of the present invention, in which FIG. 8A is a plan view of the white key, FIG. 8B is a cross-sectional view taken along line B-B of FIG. 8A, and FIG. 8C is a plan view of the white key in a state in which a front portion thereof is cut off horizontally;

FIGS. 9A and 9B are views useful in explaining the relationship between the white key and a white key guide, in which FIG. 9A is a perspective view of a front portion of the white key, as viewed from below, which has a front end thereof cut off vertically, and FIG. 9B is a view of the front portion of the white key appearing in FIG. 8C on an enlarged scale;

FIGS. 10A and 10B are views useful in explaining the relationship between the white key and the white key guide at the time of removal of the white key from the keyboard chassis, in which FIG. 10A shows a state in which the white key guide is positioned between opposite guide walls of the white key, and FIG. 10B shows a state in which the white key guide is disengaged from the opposite guide walls of the white key.

DETAILED DESCRIPTION OF PREFERRED EMBODIMENTS

Figure 1A:
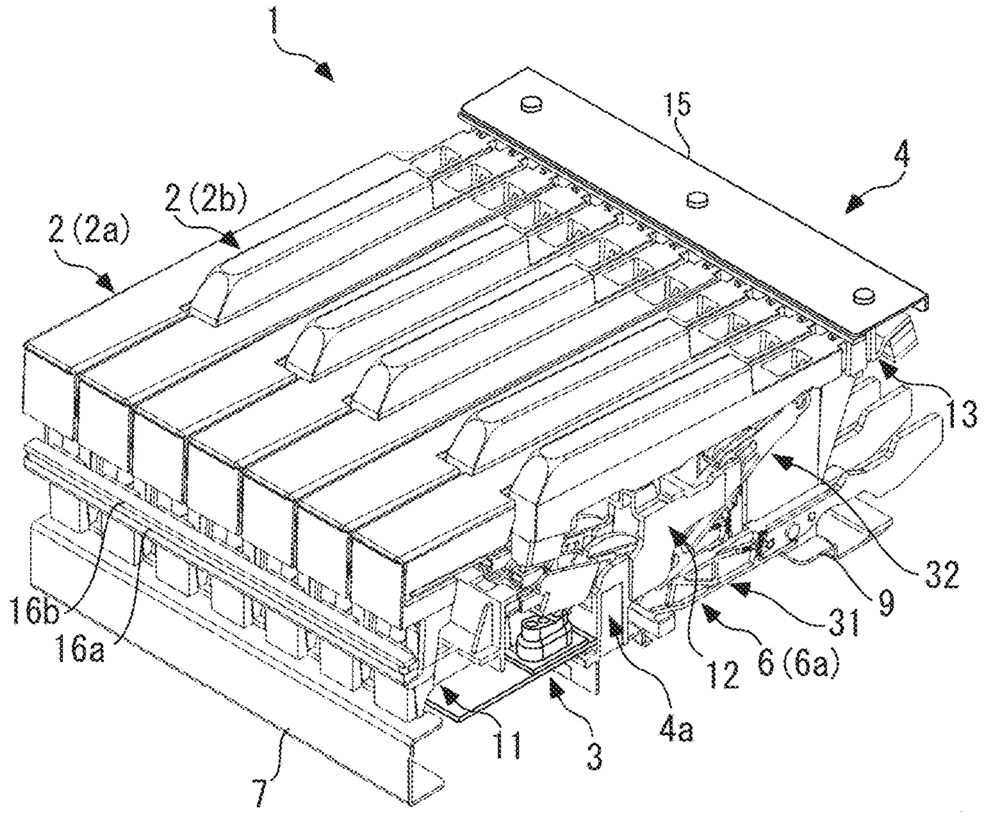

The present invention will now be described in detail with reference to the drawings showing preferred embodiments thereof. FIG. 1A shows only one octave section of a keyboard device 1 for an electronic piano to which the present invention is applied. Note that in the following, a description will be first given of the basic construction of the keyboard device 1 and operation thereof, and then of an essential part of the present invention.

Figure 1B:
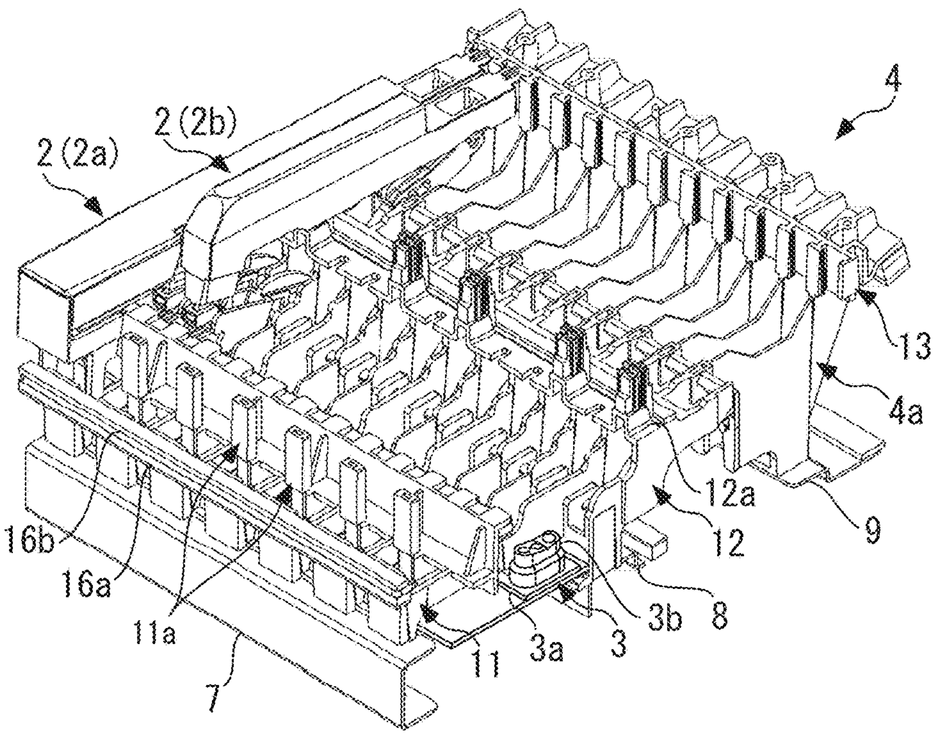
Figure 2:
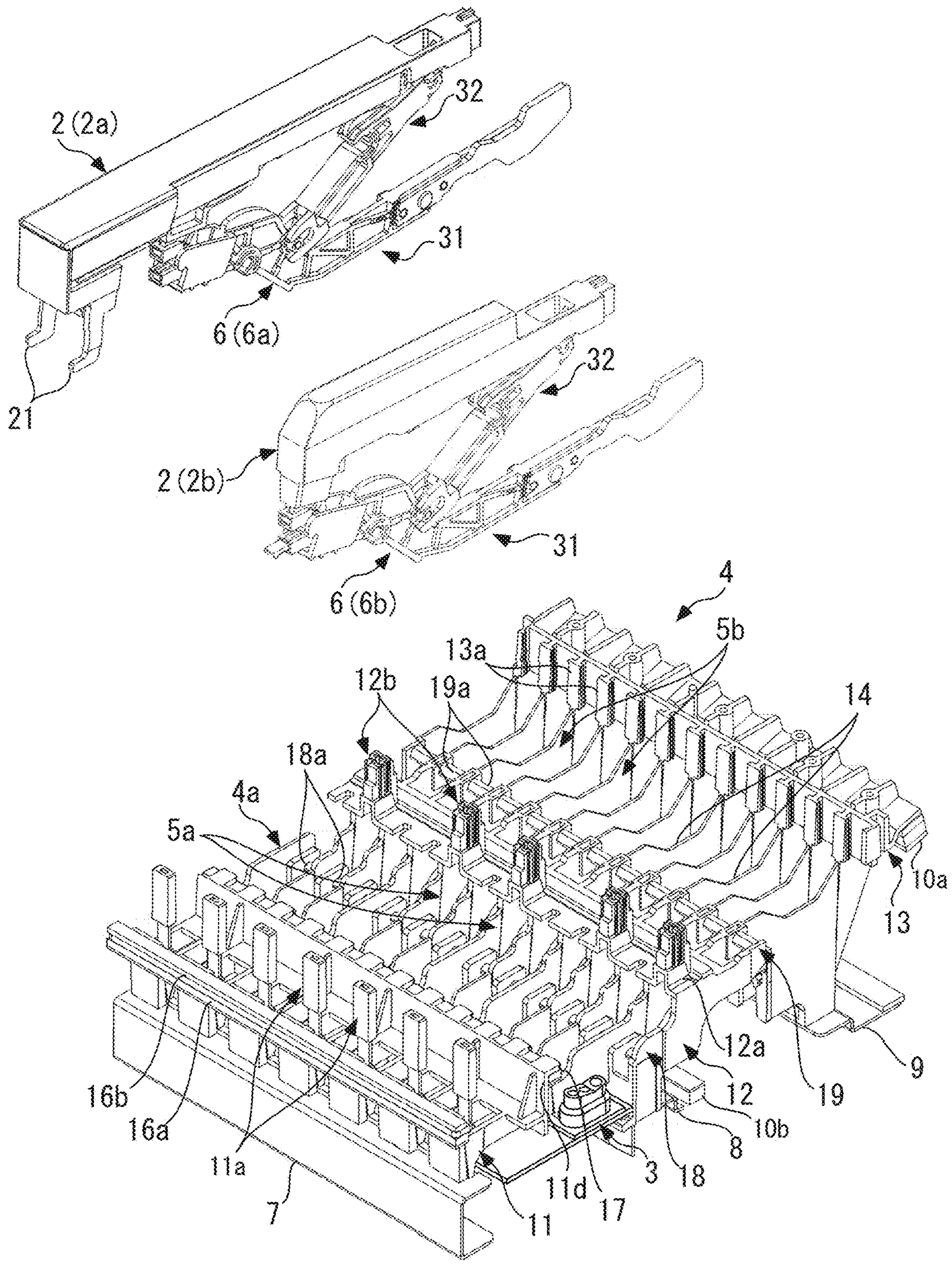
FIG. 2 is a perspective view of the keyboard device shown in FIG. 1B in a state in which the white key and the black key are removed, together with respective key support mechanisms therefor, from a keyboard chassis.

FIG. 1B shows a state of the keyboard device 1 shown in FIG. 1A, in which keys 2 other than a white key 2*a* and a black key 2*b* at the left end of the keyboard device 1 are omitted. FIG. 2 shows a state of the keyboard device 1 shown in FIG. 1B, in which the white key 2*a* and the black key 2*b* are removed, together with respective key support mechanisms 6 therefor, from a keyboard chassis 4.

This keyboard device 1 is comprised of the keyboard chassis 4, the plurality of keys 2 including the white keys 2*a* and the black keys 2*b* and arranged side by side in a left-right direction, a plurality of key support mechanisms 6 each pivotally mounted on the keyboard chassis 4, for supporting an associated one of the keys 2 from below, and key switches 3 each for detecting key depression information of an associated one of the keys 2.

Figure 3A:
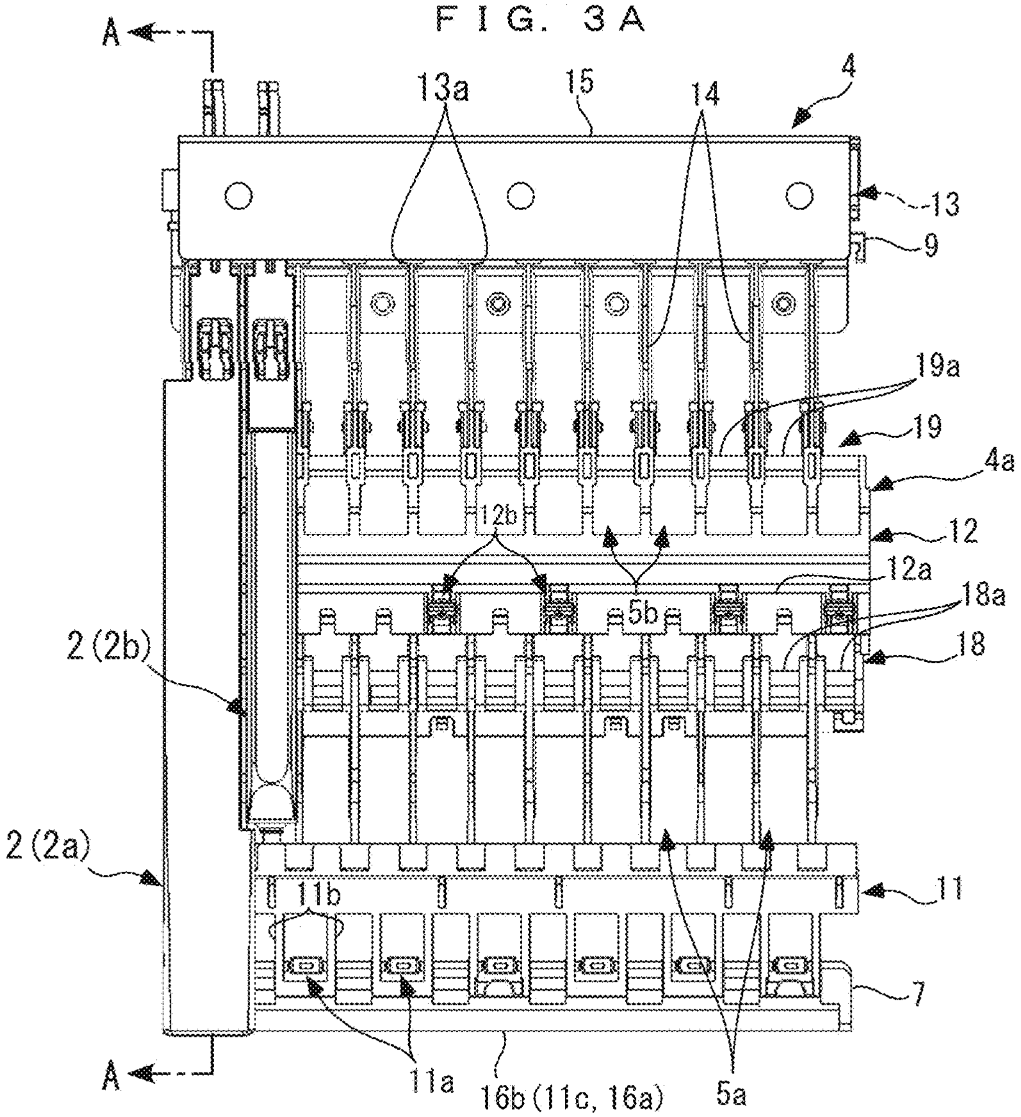
FIG. 3A is a plan view of the keyboard device in which the keys other than the white key and the black key at the left end thereof are omitted.
Figure 3B:
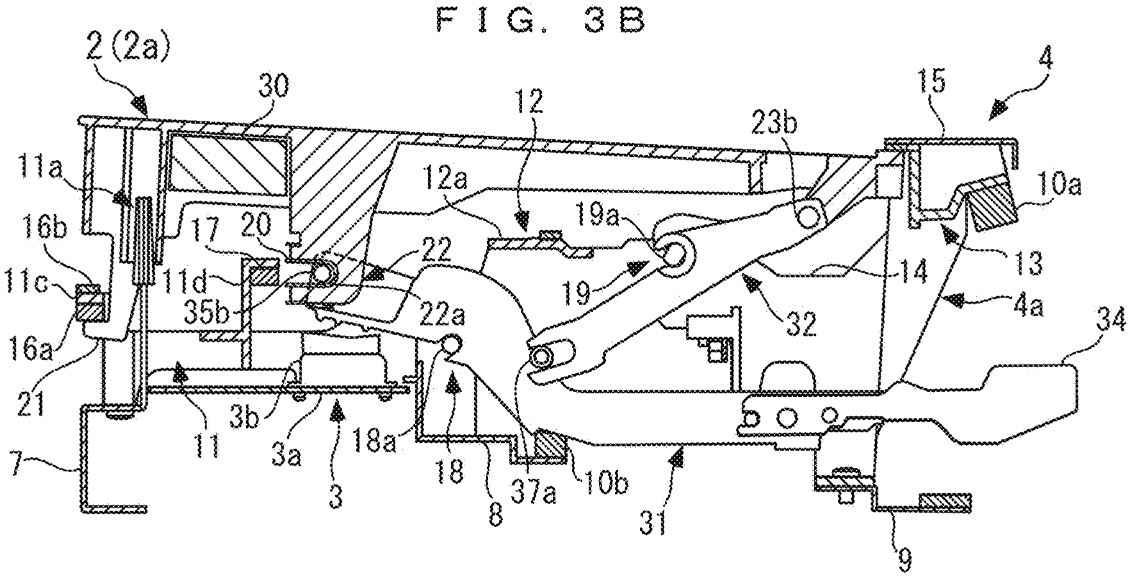
FIG. 3B is a cross-sectional view taken along line A-A of FIG. 3A.

The keyboard chassis 4 includes a chassis body 4*a* formed as a resin molded article which is made e.g., by injection molding of a predetermined resin material (e.g., an ABS resin) into a predetermined shape. As shown in FIGS. 3A and 3B, the chassis body 4*a* has a front portion 11, an intermediate portion 12, and a rear portion 13, each extending in the left-right direction (in a left-right direction in FIG. 3A) as a whole. The front portion 11, the intermediate portion 12, and the rear portion 13 are integrally formed with each other via a plurality of ribs 14 disposed with a spacing therebetween in the left-right direction and each extending in the front-rear direction. Note that in the following description, the front portion 11, the intermediate portion 12, and the rear portion 13 of the chassis body 4*a* of the keyboard chassis 4 will be referred to as "the chassis front 11", "the chassis intermediate 12", and "the chassis rear 13", respectively.

The chassis front 11 is mainly for guiding the white key 2*a* during depression thereof and restricting the upper limit position and the lower limit position of a front end of the white key 2*a*. On the chassis front 11, there are erected a plurality of white key guides 11*a*, each of which is inserted into each associated one of the white keys 2*a* from below so as to prevent lateral swing of the white key 2*a*, in a state arranged side by side in the left-right direction. Further, the chassis front 11 has engagement holes 11*b* and 11*b*, vertically extending therethrough, which are formed on the left and right sides of each of the white key guides 11*a*, respectively. A pair of left and right upper limit position regulation portions 21 and 21, referred to hereinafter, of the white key 2*a* are engaged with the respective engagement holes 11*b* and 11*b* in a state inserted therethrough. Furthermore, the chassis front 11 has a front end thereof formed with a stopper-mounting portion 11*c* that protrudes forward and extends along the entirety of the chassis body 4*a* in the left-right direction. A key upper limit stopper 16*a* and a key lower limit stopper 16*b* for the white key 2*a* are mounted on a lower surface and an upper surface of the stopper-mounting portion 11*c*, respectively, such that they extend in the left-right direction. Note that a stopper-mounting portion 11*d* for the black key, which extends along the entirety of the chassis body 4*a* in the left-right direction, is provided at a predetermined location of the chassis front 11, rearward of each white key guide 11*a*, and a key upper limit stopper 17 for the black key is mounted on the stopper-mounting portion 11*d* such that it extends in the left-right direction.

The chassis intermediate 12 is mainly for guiding the black key 2*b* during depression thereof and swingably supporting a first arm 31 and a second arm 32, described hereinafter, of each of a white key-associated key support mechanism 6*a* and a black key-associated key support mechanism 6*b*. The chassis intermediate 12 has a flat portion 12*a* in the form of a flat plate extending in the left-right direction, and a plurality of black key guides 12*b* erected on the flat portion 12*a* and disposed with an appropriate spacing therebetween in the left-right direction. Each black key guide 12*b* is inserted into an associated one of the black keys 2*b* from below to prevent lateral swing of the black key 2*b*. Further, the chassis intermediate 12 has a front portion thereof provided with a first arm support portion 18 for supporting the first arms 31 of the key support mechanisms 6. The first arm support portion 18 has a plurality of first pivot shafts 18*a* each of which is provided between each adjacent two of the ribs 14 and 14 such that the first pivot shaft 18*a* extends in the left-right direction. The first arms 31 are swingably supported on associated ones of the first pivot shafts 18*a*. Furthermore, the chassis intermediate 12 has a rear portion thereof provided with a second arm support portion 19 for supporting the second arms 32 of the key support mechanisms 6. The second arm support portion 19 has a plurality of second pivot shafts 19*a* each of which is provided between each adjacent two of the ribs 14 and 14 such that the second pivot shaft 19*a* extends in the left-right direction. The plurality of second pivot shafts 19*a* are arranged on the same axis extending in the left-right direction at a location rearward of and higher than the first pivot shafts 18*a*, and the second arms 32 are swingably supported on associated ones of the second pivot shafts 19*a*. Note that a first arm lower limit stopper 10*b* extending along the entirety of the chassis body 4*a* in the left-right direction is provided at a predetermined location of a middle rail 8, referred to hereinafter, provided below the chassis intermediate 12.

Further, the above-mentioned key switches 3 are mounted on a lower portion of the keyboard chassis 4 between the above-described chassis front 11 and chassis intermediate 12. The key switches 3 are formed by a laterally elongated printed circuit board 3*a* extending in the left-right direction, and a plurality of switch bodies 3*b* formed by rubber switches attached to the printed circuit board 3*a* on a key-by-key basis, for being pressed by associated ones of the first arms 31 upon key depression.

The chassis rear 13 is mainly for guiding the keys 2 by their rear ends in the vertical direction while preventing lateral swing of the keys 2 and for restricting the upper limit positions of the rear ends of associated ones of the first arms 31. As shown in FIGS. 2 and 3A, the chassis rear 13 has a plurality of partition walls 13*a* formed with a predetermined spacing therebetween in the left-right direction so as to separate each adjacent two of the keys 2 and 2 from each other. Further, as shown in FIG. 3B, a first arm upper limit stopper 10*a* extending along the entirety of the chassis body 4*a* in the left-right direction is provided at a predetermined location of an upper portion of the chassis rear 13. The first arm upper limit stopper 10*a* and the first arm lower limit stopper 10*b* provided on the chassis intermediate 12 are for restricting the upper limit position and the lower limit position of the first arm 31, respectively, when the first arm 31 having a function as a hammer for adding a touch weight to the key 2 pivotally moves upward and downward. Furthermore, a metal cover plate 15 extending in the left-right direction along the entirety of the chassis body 4*a* and disposed to cover the rear ends of the keys 2 is mounted on the upper portion of the chassis rear 13.

As shown in FIGS. 2 and 3A, the chassis body 4*a* of the keyboard chassis 4 constructed as described above is formed with a plurality of first openings 5*a* open upward and forward and a plurality of second openings 5*b* open upward. The first arms 31 of the key support mechanisms 6 are engaged with associated ones of the first pivot shafts 18*a* from outside via the above-mentioned first openings 5*a*, respectively. Further, the second arms 32 are engaged with associated ones of the second pivot shafts 19*a* from outside via the above-mentioned second openings 5*b*, respectively.

Further, in the above-described keyboard chassis 4, a plurality of chassis bodies 4*a* are connected to each other in a state arranged side by side in the left-right direction, and are each screwed to a front rail 7, the middle rail 8, and a rear rail 9 in a state placed thereon, the rails 7, 8 and 9 each extending in the left-right direction and arranged with a predetermined spacing therebetween in the front-rear direction. The keyboard chassis 4 is fixed to a keybed, not shown, of the electronic piano via the front rail 7 and the rear rail 9.

Figure 4A:
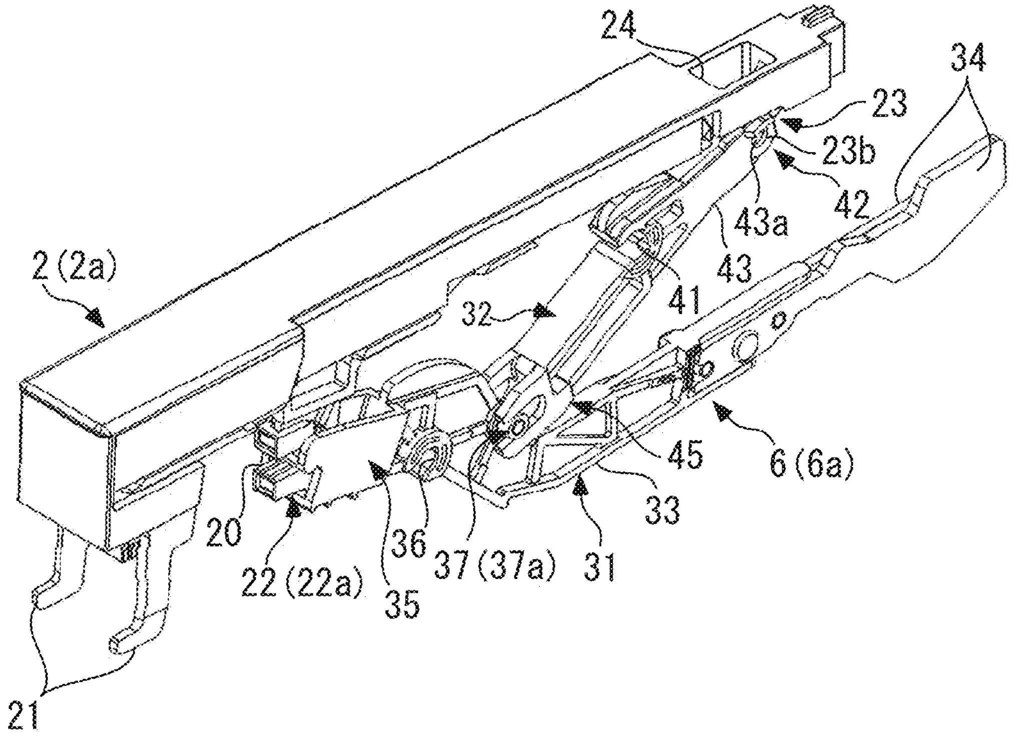
Figure 4B:
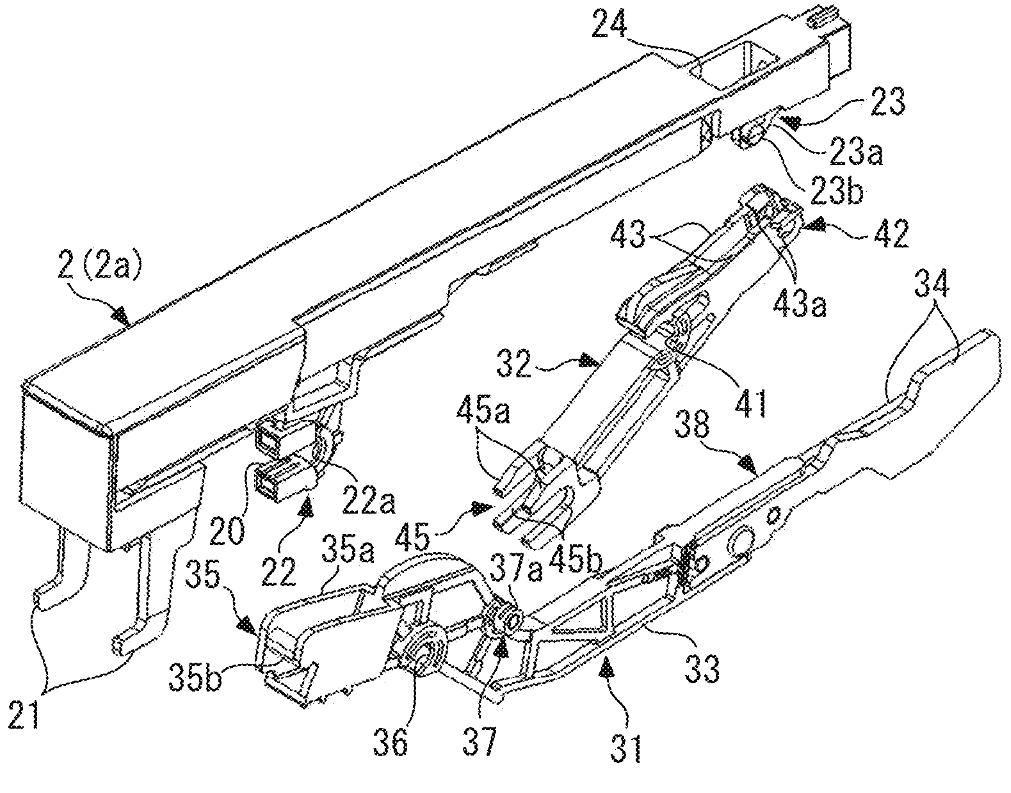

Next, the keys 2 and the key support mechanisms 6 will be described. FIG. 4A shows the white key 2*a* and the key support mechanism 6*a* therefor on an enlarged scale, and FIG. 4B shows them in an exploded state. As shown in FIGS. 4A and 4B, the white key 2*a* is formed into a hollow shape which extends a predetermined length in the front-rear direction and opens downward e.g., by injection molding of a predetermined resin material (e.g., an AS resin). The white key 2*a* has the front end thereof formed with the pair of left and right upper limit position regulation portions 21 and 21 which protrude downward from respective side walls of the front end of the white key 2*a* and each having a lower end thereof bent forward. As described hereinabove, the left and right upper limit position regulation portions 21 and 21 are engaged with the respective left and right engagement holes 11*b* and 11*b* of the chassis front 11 in a state inserted therethrough.

Further, at a predetermined location of the front portion of the white key 2*a*, rearward of the upper limit position regulation portions 21, there is provided a key front-side connecting portion 22 connected to the first arm 31 of the key support mechanism 6*a*. This key front-side connecting portion 22 includes a connecting recess 22*a* which has a U shape having a slot-like shape in side view and open forward. Further, the connecting recess 22*a* has a cushioning member 20 attached thereto, which is formed to cover the whole inner peripheral surface of the connecting recess 22*a*, for suppressing generation of noise when a connecting shaft 35*b*, referred to hereinafter, of the first arm 31 slides in the inner peripheral surface of the connecting recess 22*a*. Note that in the front portion of the white key 2*a*, between the above-mentioned upper limit position regulation portions 21 and key front-side connecting portion 22, there is mounted a keyboard-associated weight 30 (see FIG. 3B) for adding a touch weight to the white key 2*a* during depression thereof.

Furthermore, the white key 2*a* has a rear portion thereof provided with a key rear-side connecting portion 23 connected to the second arm 32 of the key support mechanism 6*a*. The key rear-side connecting portion 23 has a plate-like connecting body portion 23*a* which hangs downward from a laterally central portion of the white key 2*a* and has a predetermined thickness in the left-right direction, and a pair of left and right engaging protrusions 23*b* and 23*b* which coaxially protrude from the left and right side surfaces of the connecting body portion 23*a*, respectively. Further, the rear portion of the white key 2*a* is formed with a tool insertion hole 24 which vertically extends through the rear portion, and is used to have a predetermined tool inserted therein from above for disconnecting the white key 2*a* from the second arm 32 of the key support mechanism 6*a* e.g., at the time of maintenance of the keyboard device 1.

On the other hand, the key support mechanism 6*a* includes the first arm 31 and the second arm 32 which are engaged with each other and are connected to the key front-side connecting portion 22 and the key rear-side connecting portion 23 of the white key 2*a*, respectively.

As shown in FIG. 4B, the first arm 31 is comprised of an arm body 33 and two weights 34 and 34 attached to the arm body 33. The arm body 33 is formed as a resin molded article which is made e.g., by injection molding of a predetermined resin material (e.g., polyacetal resin) into a predetermined shape. This arm body 33 extends a predetermined length in the front-rear direction, and has a front end thereof formed with a first arm front-side connecting portion 35 connected to the key front-side connecting portion 22 of the white key 2*a*. The first arm front-side connecting portion 35 includes a box portion 35*a* having a box-like shape open upward and forward, and the connecting shaft 35*b* provided such that it extends in the left-right direction in a state connecting the front-side upper ends of left and right side walls of the box portion 35*a* to each other. The connecting shaft 35*b* is connected to the connecting recess 22*a* of the key front-side connecting portion 22 of the white key 2*a* such that the connecting shaft 35*b* is pivotally movable and is slidable in the front-rear direction.

Further, the arm body 33 has a bearing portion 36 formed at a predetermined location immediately rearward of the first arm front-side connecting portion 35. The bearing portion 36 has an inverted U shape open downward in side view, and is pivotally engaged with the first pivot shaft 18*a* of the keyboard chassis 4. Furthermore, the arm body 33 has a first arm rear-side connecting portion 37 formed at a predetermined location rearward of the bearing portion 36, for connection to the second arm 32. Specifically, the first arm rear-side connecting portion 37 has a connecting shaft 37*a* which extends in the left-right direction with respective opposite ends thereof protruding outward from the left and right side surfaces of the arm body 33. The opposite ends of the connecting shaft 37*a* are engaged with connecting recesses 45*b* and 45*b* of a second arm front-side connecting portion 45, referred to hereinafter, of the second arm 32.

The two weights 34 and 34 formed as elongated and narrow plates are mounted on a weight mounting portion 38, which is a rear portion of the arm body 33, in a state sandwiching the weight mounting portion 38. Note that each weight 34 is made of a material (metal such as iron) having a larger specific gravity than the arm body 33, and is formed e.g., by pressing a metal plate into a predetermined shape.

The second arm 32 is formed as a resin molded article having a predetermined shape by injection molding of the same resin material as that of the arm body 33 of the first arm 31. The second arm 32 is shorter than the first arm 31 and extends a predetermined length in the front-rear direction. Further, the second arm 32 has a bearing portion 41 having a C shape open forward in side view at about a longitudinal center thereof. The bearing portion 41 is pivotally engaged with an associated one of the second pivot shafts 19*a* of the keyboard chassis 4.

Further, the second arm 32 has a rear portion thereof provided with a second arm rear-side connecting portion 42 connected to the key rear-side connecting portion 23 of the white key 2*a*. The second arm rear-side connecting portion 42 has a bifurcated shape formed by two left and right connecting arm portions 43 and 43 which extend a predetermined length parallel to each other along the longitudinal direction of the second arm 32. Each connecting arm portion 43 has a rear end thereof formed with a connecting hole 43*a* extending through the connecting arm portion 43 in the left-right direction. The two connecting arm portions 43 and 43 sandwich the connecting body portion 23*a* of the key rear-side connecting portion 23 of the white key 2*a* between the rear ends thereof from the left and the right, and each connecting hole 43*a* is pivotally fitted on an associated one of the engaging protrusions 23*b* of the key rear-side connecting portion 23.

Furthermore, the second arm 32 has a front portion thereof provided with the second arm front-side connecting portion 45 connected to the first arm rear-side connecting portion 37 of the first arm 31. The second arm front-side connecting portion 45 has a pair of left and right connecting portions 45*a* and 45*a* arranged with a predetermined spacing in the left-right direction. The connecting portions 45*a* and 45*a* are each formed with the connecting recess 45*b* which has a U shape having a slot-like shape in side view and open forward. The left and right connecting portions 45*a* and 45*a* of the second arm front-side connecting portion 45 are pivotally and slidably engaged with the respective opposite ends of the connecting shaft 37*a* of the first arm 31 via the connecting recesses 45*b* and 45*b* thereof.

Figure 5A:
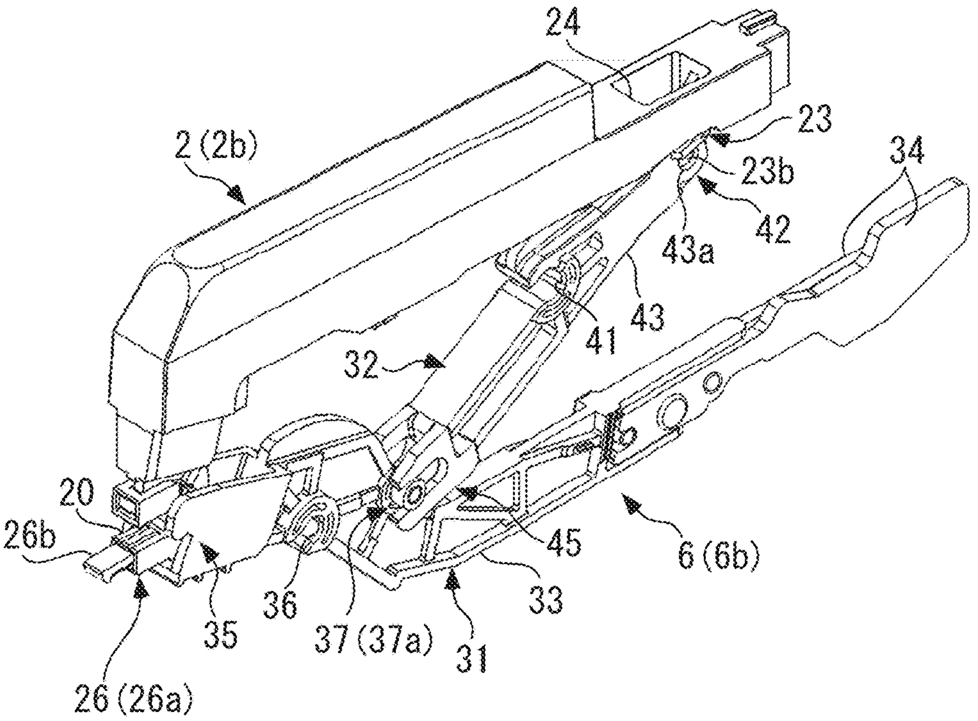
Figure 5B:
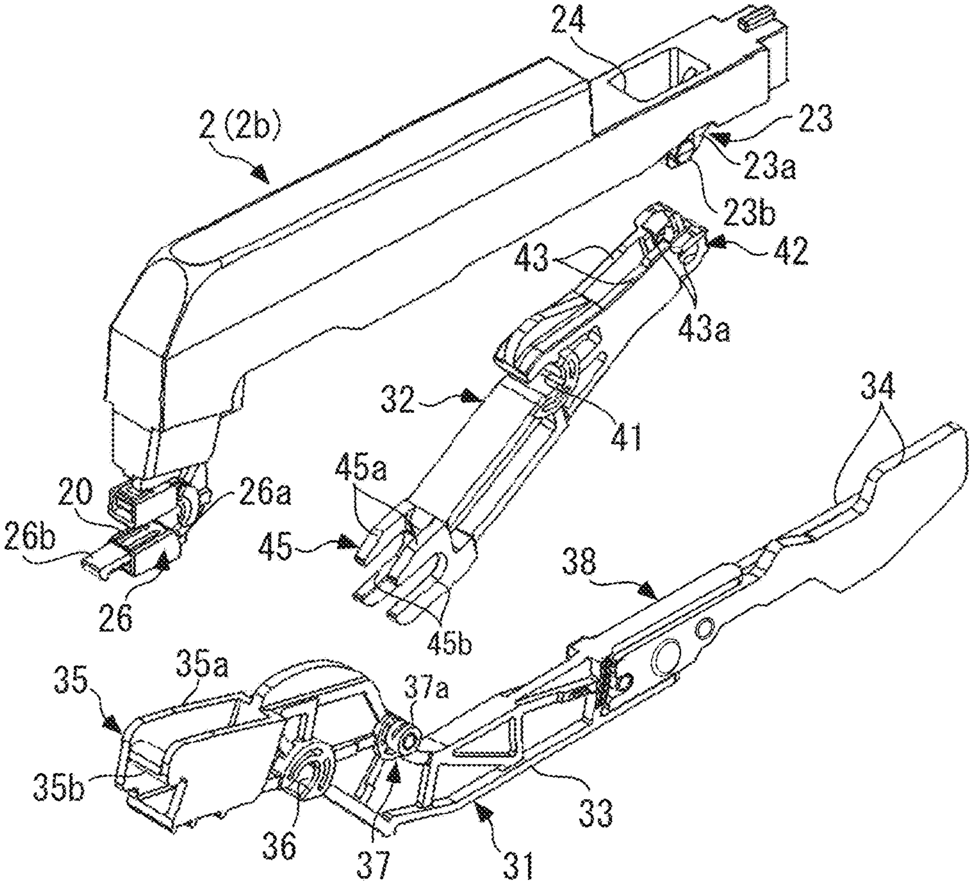

FIG. 5A shows the black key 2*b* and the key support mechanism 6*b* therefor on an enlarged scale, and FIG. 5B shows the black key 2*b* and the key support mechanism 6*b* in an exploded state. The black key 2*b* is formed e.g., by injection molding of the same resin material as that of the white key 2*a* into a hollow shape which extends in the front-rear direction by a predetermined length shorter than that of the white key 2*a* and opens downward. The black key 2*b* has a front-side lower end thereof provided with a key front-side connecting portion 26 formed substantially similar to the key front-side connecting portion 22 of the white key 2*a*. This key front-side connecting portion 26 has a connecting recess 26*a* which has a U shape having a slot-like shape in side view and open forward. Further, the key front-side connecting portion 26 has an extension portion 26*b* on a lower-side front end of the connecting recess 26*a*. The extension portion 26*b* extends a predetermined length forward of the front surface of the body of the black key 2*b*. This extension portion 26*b* functions as an upper limit position regulation portion of the black key 2*b*. Note that in the following description, the components of the black key 2*b* and the key support mechanism 6*b* having the same configurations as those of the above-described white key 2*a* and key support mechanism 6*a* are denoted by the same reference numerals and detailed description thereof will be omitted.

The key support mechanism 6*b* supporting the black key 2*b* is constructed substantially similar to the above-described white key-associated key support mechanism 6*a*. Specifically, the arm body 33 of the first arm 31 of the key support mechanism 6*b* and the second arm 32 of the same are constructed exactly similar in shape and size to the arm body 33 and the second arm 32 of the white key-associated key support mechanism 6*a*. Note that although the two left and right weights 34 and 34 of the black key-associated key support mechanism 6*b* are illustrated exactly the same as the weights 34 and 34 of the white key-associated key support mechanism 6*a*, the shapes and sizes of the weights 34 and 34 of the key support mechanisms 6*a* and 6*b* are changed as deemed appropriate according to touch weights and the like required for the keys 2.

Figure 6A:
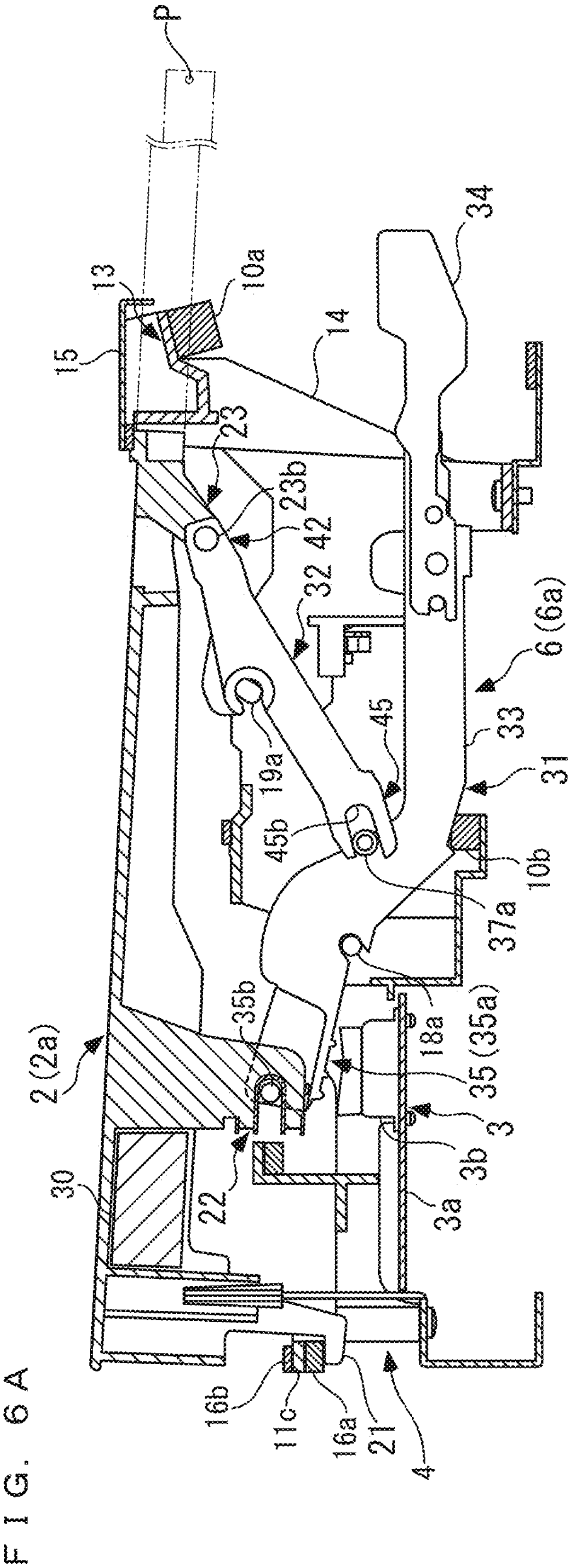
Figure 6B:
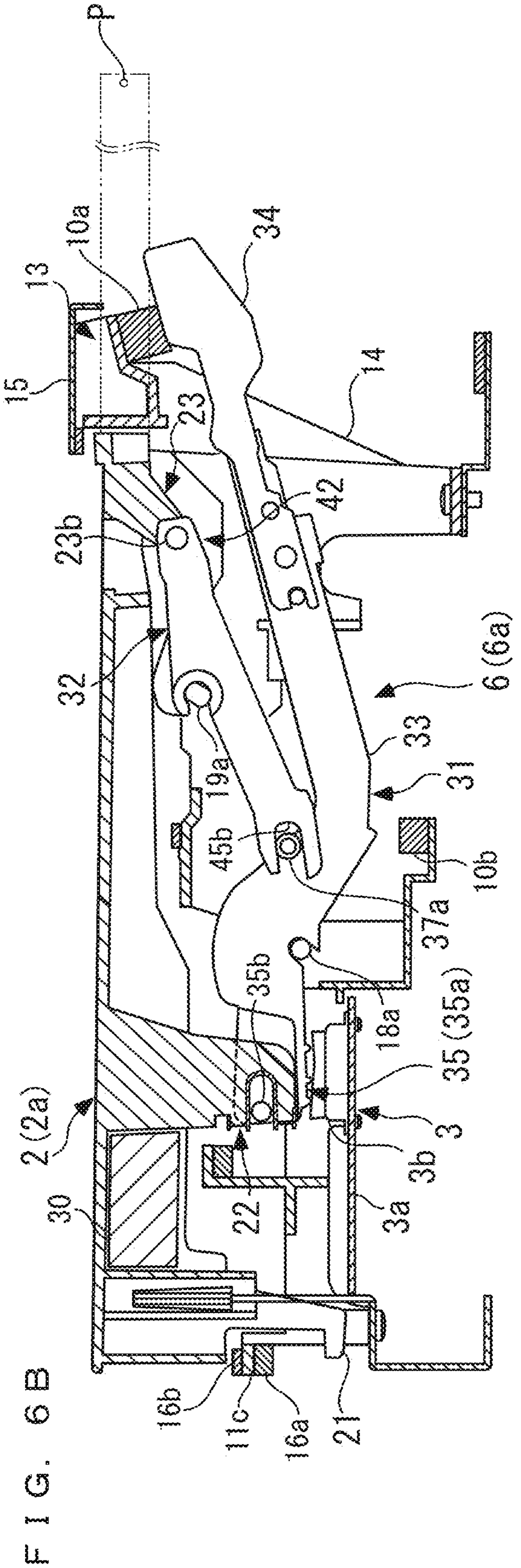
Figure 7A:
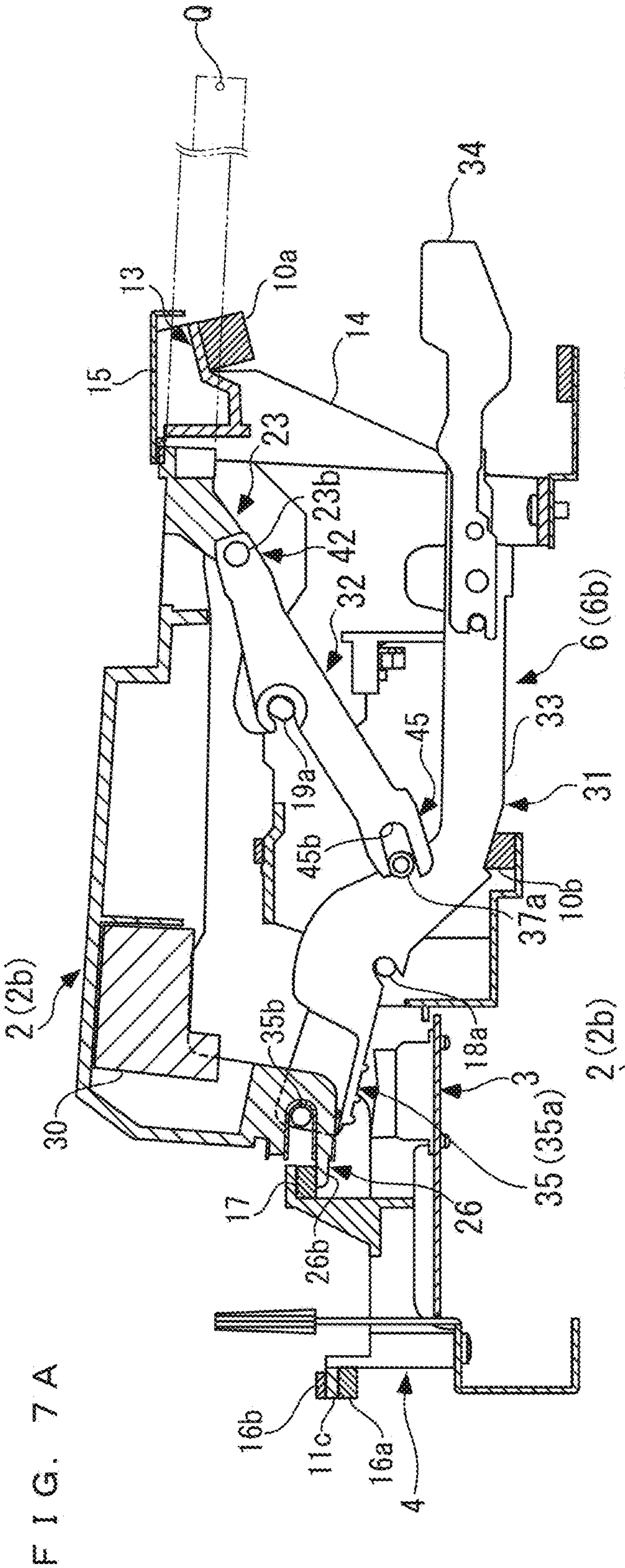
Figure 7B:
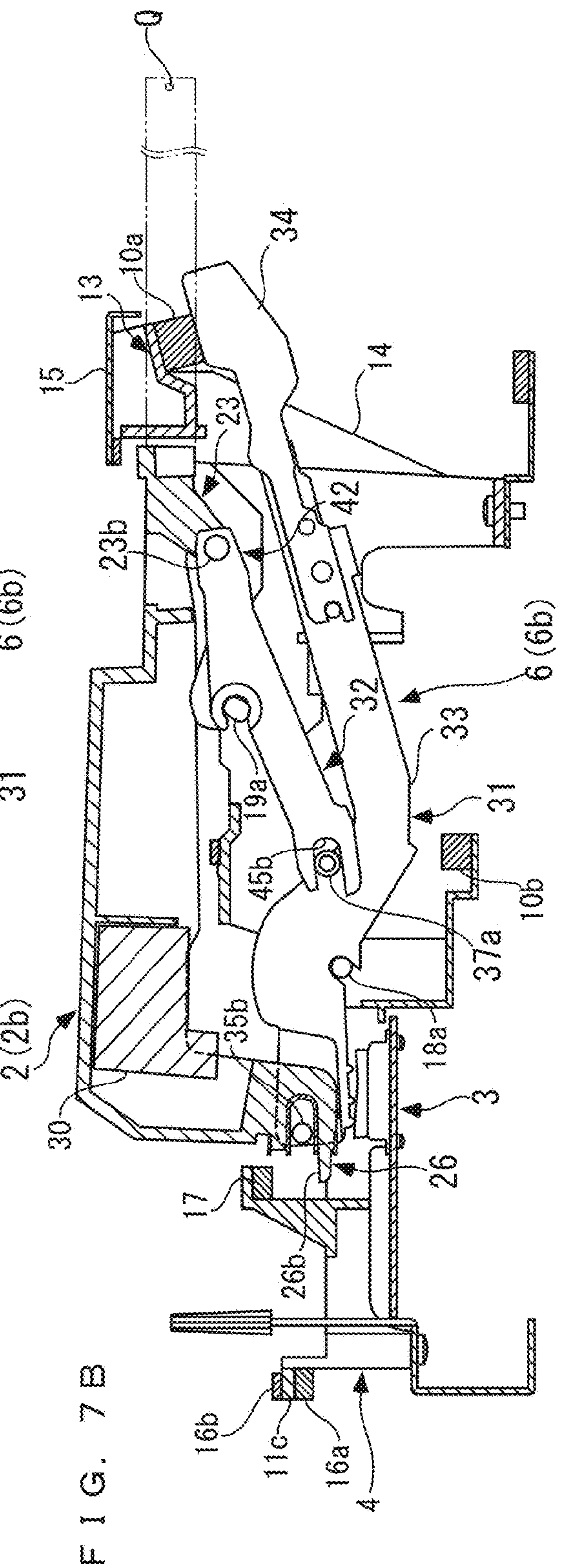

Next, a description will be given of the operation of the keys 2 and the key support mechanisms 6 of the keyboard device 1 constructed as described above. FIGS. 6A and 6B are views useful in explaining the operation of the white key 2*a* and the key support mechanism 6*a* associated therewith. FIGS. 7A and 7B are views useful in explaining the operation of the black key 2*b* and the key support mechanism 6*b* associated therewith.

When the front end of the white key 2*a* is depressed by a player with his/her finger from a key-released state shown in FIG. 6A, the key front-side connecting portion 22 of the white key 2*a* is moved downward, whereby the first arm 31 is pivotally moved in a counterclockwise direction about the first pivot shaft 18*a*. Further, in accordance with the pivotal movement of the first arm 31, the second arm front-side connecting portion 45, which is engaged with the connecting shaft 37*a* of the first arm 31 via the connecting recesses 45*b* and 45*b*, is moved upward. With this, the second arm 32 is pivotally moved in a clockwise direction about the second pivot shaft 19*a*. Then, in accordance with this pivotal movement of the second arm 32, the key rear-side connecting portion 23, which is connected to the second arm 32 via the second arm rear-side connecting portion 42 formed at the rear end of the second arm 32, is pulled down, whereby the rear end of the white key 2*a* is moved downward.

Note that during the above-mentioned pivotal movement of the first arm 31, the box portion 35*a* of the first arm front-side connecting portion 35 is moved downward, and accordingly, the switch body 3*b* of one of the key switches 3, which is associated with the depressed key 2, is pressed from above by the bottom wall of the box portion 35*a*. As a consequence, in the electronic piano, key depression information of the depressed key 2 is detected, and based on the detected key depression information, sound is generated from a speaker, not shown.

As described above, in the case where the white key 2*a* is depressed, in accordance with the counterclockwise pivotal movement of the first arm 31, the weight 34 of the first arm 31 is inclined such that the weight 34 becomes higher as it extends rearward, whereby the rear end of the weight 34 is brought into contact with the first arm upper limit stopper 10*a* from below, as shown in FIG. 6B. This prevents further pivotal movement of the first arm 31. When the front end of the white key 2*a* is depressed to its lowest position, the front end of the white key 2*a* is brought into contact with the key lower limit stopper 16*b*, which blocks further depression of the white key 2*a*.

The white key 2*a* depressed as described above operates such that it pivotally moves about a virtual pivot P located rearward of the rear end thereof. The location of the virtual pivot P is set such that a distance from the front end of the white key 2*a* becomes e.g., approximately twice as long as the length of the white key 2*a* itself. With this, when the front end of the white key 2*a* is depressed to the lowest position, compared with the case where the white key 2*a* is in the key-released state shown in FIG. 6A, the front end of the white key 2*a* is positioned lower by a predetermined key stroke (e.g., 10 mm) and the rear end of the white key 2*a* is located lower by a distance (e.g., 5 mm) which is approximately half of the predetermined key stroke.

On the other hand, when the finger is released from the white key 2*a* being depressed, the first arm 31 of the key support mechanism 6*a* pivotally moves in a direction opposite to the above-mentioned direction, by the own weight of the weight 34, and in accordance therewith, the second arm 32 as well pivotally moves in a direction opposite to the above-mentioned direction. In accordance with this pivotal movement of the second arm 32, the white key 2*a* pivotally moves upward about the virtual pivot P. Then, a predetermined portion of the first arm 31, rearward of the first pivot shaft 18*a*, moves into contact with the first arm lower limit stopper 10*b* from above, and both of the upper limit position regulation portions 21 and 21 of the white key 2*a* move into contact with the key upper limit stopper 16*a* from below, whereby further pivotal movement of the white key 2*a* is blocked and the white key 2*a* returns to its original key-released state.

Further, operation in response to depression of the black key 2*b* is performed similar to the above-described operations of the white key 2*a* and the key support mechanism 6*a* in response to depression of the white key 2*a*. More specifically, when a front end of the black key 2*b* is depressed from a key-released state shown in FIG. 7A, the first arm 31 is pivotally moved in the counterclockwise direction about the first pivot shaft 18*a*, and the second arm 32 is pivotally moved in the clockwise direction about the second pivot shaft 19*a*. With this, the black key 2*b* operates such that it pivotally moves about a virtual pivot Q located rearward of the rear end thereof. Note that similar to the above-mentioned virtual pivot P of the white key 2*a*, the location of the virtual pivot Q is set such that a distance from the front end of the black key 2*b* becomes e.g., approximately twice as long as the length of the black key 2*b* itself. Therefore, when the front end of the black key 2*b* is depressed to its lowest position, compared with a case where the black key 2*b* is in the key-released state shown in FIG. 7A, the front end of the black key 2*b* is positioned lower by a predetermined key stroke and the rear end thereof is positioned lower by a distance which is approximately half of the predetermined key stroke.

On the other hand, when the finger is released from the black key 2*b* having been depressed, the first arm 31 and the second arm 32 of the key support mechanism 6*b* pivotally move in respective directions opposite to the above-mentioned directions, and in accordance therewith, the black key 2*b* pivotally moves upward about the virtual pivot Q. Then, the extension portion 26*b* of the key front-side connecting portion 26 of the black key 2*b* moves into contact with the key upper limit stopper 17 from below, whereby further pivotal movement of the black key 2*b* is blocked, and the black key 2*b* returns to its original key-released state.

Next, the essential part of the present invention will be described with reference to FIGS. 8A to 10B. The essential part of the present invention is a construction of a key guide structure for smoothly guiding the key 2 pivotally moving during key depression, in the vertical direction without lateral swing.

Figure 8A:
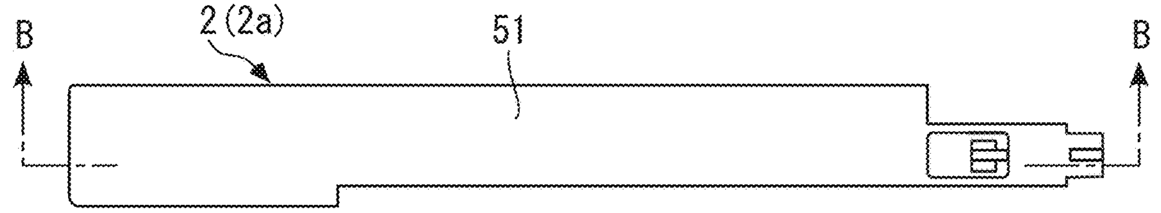
Figure 8B:
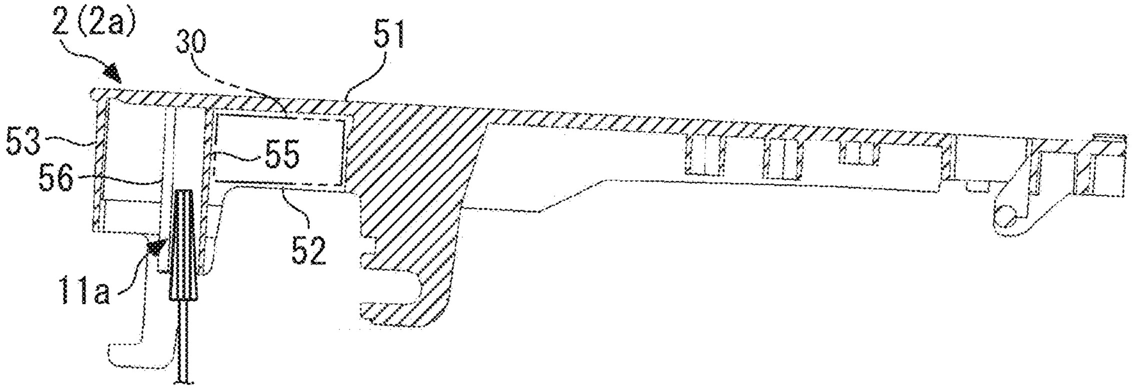
Figure 8C:
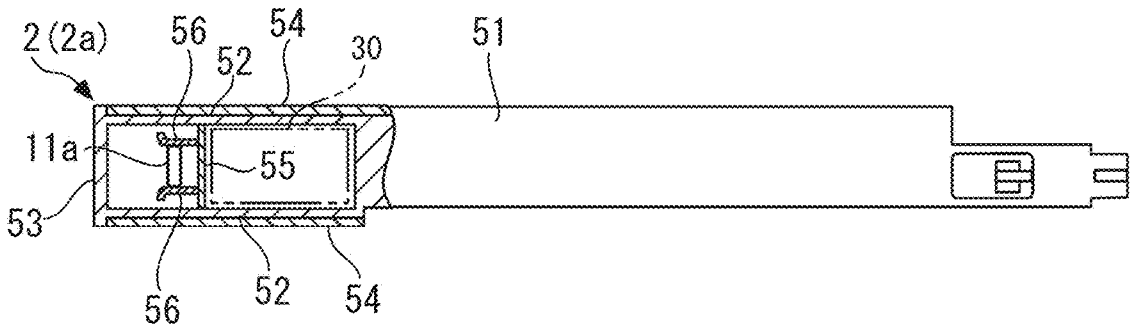
Figure 9A:
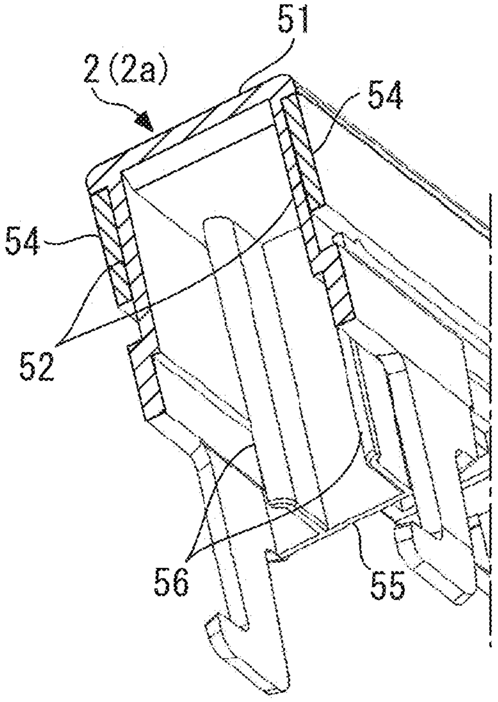
Figure 9B:
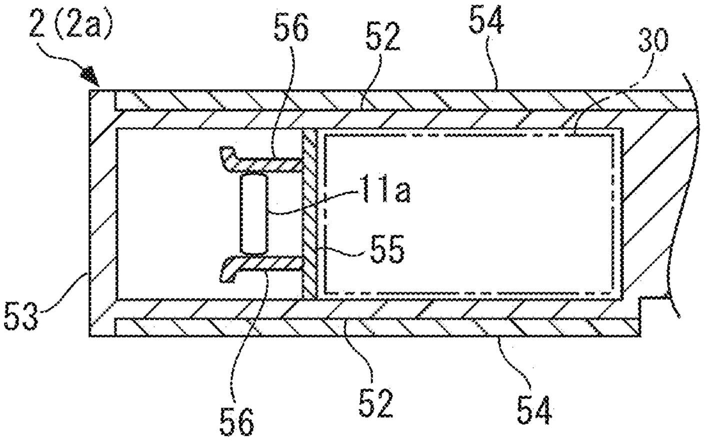

FIG. 8A is a plan view of the white key 2*a*, FIG. 8B is a cross-sectional view taken along line B-B of FIG. 8A, and FIG. 8C is a plan view of the white key 2*a* in a state in which a front portion thereof is cut off horizontally. Further, FIGS. 9A and 9B show the front portion of the white key 2*a*. FIG. 9A shows the internal construction of the front portion of the white key 2*a*, and FIG. 9B shows the relationship between the white key 2*a* and an associated one of the white key guides 11*a*. As shown in FIGS. 8A to 9B, the white key 2*a* includes a top wall 51, left and right side walls 52 and 52, and a front wall 53, which have respective predetermined thicknesses. Note that woody boards 54 and 54 are attached to respective outer surfaces of the left and right side walls 52 and 52.

Further, in a hollow portion of the front portion of the white key 2*a*, at a predetermined location rearward of the front wall 53, there is provided a rib wall 55 which extends between the left and right side walls 52 and 52 in the left-right direction and hangs downward from the top wall 51 by a predetermined length. Further, at a location forward of the rib wall 55, there are formed a pair of left and right guide walls 56 and 56 which are continuous with the rib wall 55 and the top wall 51 and extend forward a predetermined length from the rib wall 55 with a predetermined spacing therebetween in the left-right direction (in a vertical direction in FIG. 9B).

As shown in FIG. 9B, a distance between the two guide walls 56 and 56 is set to be approximately equal to a lateral width of the white key guide 11*a*. The white key guide 11*a* positioned in the state inserted from below between the guide walls 56 and 56 is in sliding contact with the two guide walls 56 and 56.

Further, the two guide walls 56 and 56 are each formed at a predetermined distance from the front wall 53 and have front ends formed such that the front ends are bent in opposite directions away from each other in the left-right direction.

Figure 10A:
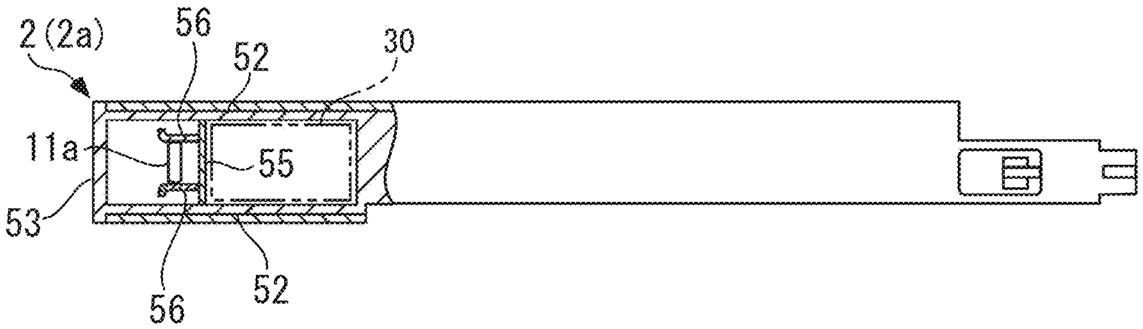
Figure 10B:
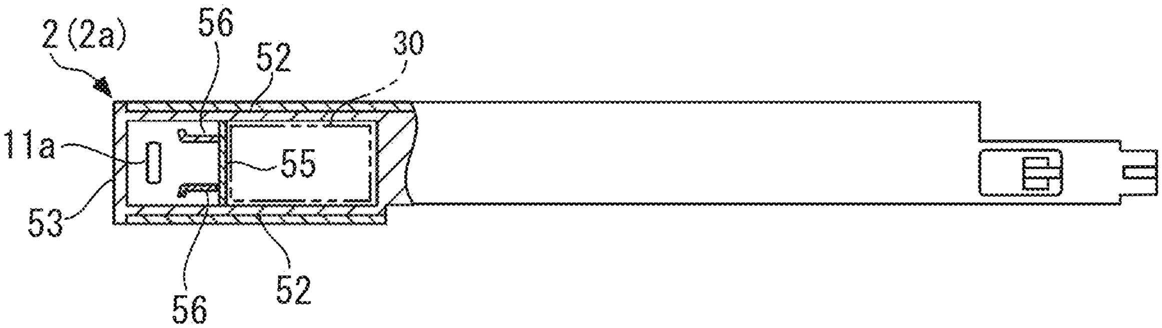

FIGS. 10A and 10B show the relationship between the white key 2*a* and the white key guide 11*a* associated therewith at the time of removal of the white key 2*a* from the keyboard chassis 4. For example, when performing maintenance of the keyboard instrument, by sliding the white key 2*a* rearward (rightward in FIG. 10A) from a state shown in FIG. 10A, as shown in FIG. 10B, it is possible to disengage the two guide walls 56 and 56 of the white key 2*a* from the white key guide 11*a* of the keyboard chassis 4 and easily remove the white key 2*a* from the keyboard chassis 4.

On the other hand, the white key 2*a* removed from the keyboard chassis 4 is mounted on the keyboard chassis 4 as follows: First, as shown in FIG. 10B, the white key 2*a* is disposed on an upper portion of the keyboard chassis 4 in a state in which the white key guide 11*a* of the keyboard chassis 4 is inserted into the white key 2*a* from below such that the white key guide 11*a* is positioned forward of the two guide walls 56 and 56 of the white key 2*a*. Then, as shown in FIG. 10A, the white key 2*a* is slid forward, whereby the white key guide 11*a* is positioned between the two guide walls 56 and 56 and engaged with the guide walls 56 and 56 in a state in sliding contact therewith.

When mounting the white key 2*a* as described above, the distance therebetween is made larger than a distance between respective portions of the guide walls 56 and 56 rearward of the front ends due to the shape of the front ends of the two guide walls 56 and 56, and therefore, when the white key 2*a* is slid forward after being disposed on the upper portion of the keyboard chassis 4, as described above, it is possible to easily position the white key guide 11*a* between the two guide walls 56 and 56, so that it is possible to efficiently mount the white key 2*a* on the keyboard chassis 4.

Figure 11:
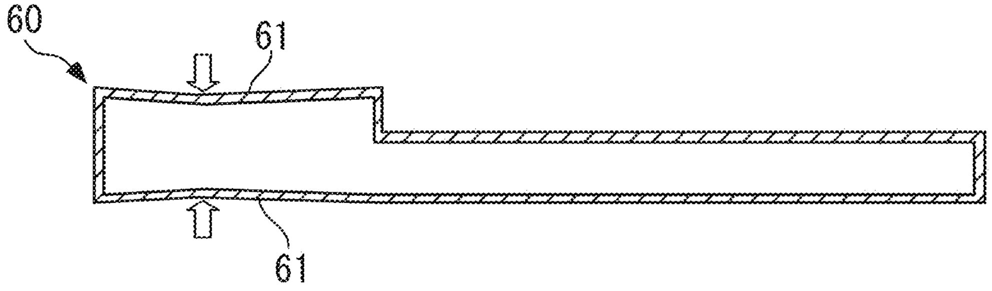
FIG. 11 PRIOR ART
FIG. 11 is a view useful in explaining inward fall of left and right side walls of a key caused when the key is molded.

As described heretofore, according to the key guide structure of the present embodiment, since the white key 2*a* is provided with the rib wall 55 extending between the left and right side walls 52 and 52 in the left-right direction, differently from the key 60, described above with reference to FIG. 11, when the white key 2*a* is molded, it is possible to prevent the left and right side walls 52 and 52 from falling inward in the vicinity of the rib wall 55. Further, since each guide wall 56 provided inside the white key 2*a* is formed to extend forward from the above-described rib wall 55, differently from the conventional key guide structure, the white key 2*a* is prevented from being affected by inward fall of the side walls 52 when the key 2 is molded. With this, it is possible to maintain the two guide walls 56 and 56 in the state in sliding contact with the white key guide 11*a*, and consequently it is possible to smoothly and stably guide the white key 2*a* being pivotally moved, while preventing lateral swing of the white key 2*a* during depression thereof.

Note that the present invention is not limited to the above-described embodiment, but it can be practiced in various forms. For example, although in the present embodiment, the description is given of a case where the key guide structure of the present invention is applied to the white key 2*a*, the key guide structure of the present invention can also be applied to the black key 2*b*. Further, details of the constructions of the rib wall 55 and the guide walls 56 of the white key 2_a_, and the key guides 11_a_ of the keyboard chassis 4 shown in the embodiment are given only by way of example, and they can be modified as appropriate within the scope of the subject matter of the present invention.

It is further understood by those skilled in the art that the foregoing are preferred embodiments of the invention, and that various changes and modifications may be made without departing from the spirit and scope thereof.

What is claimed is:

1. A key guide structure for a keyboard instrument including a plurality of keys each of which is made of a synthetic resin, and has a hollow shape extending in a front-rear direction and open downward, for being supported by an upper portion of a keyboard chassis such that the key is pivotally movable in a vertical direction, the key guide structure being configured to guide the key being pivotally moved in accordance with depression of the key, wherein each of the plurality of keys comprises:

a rib wall provided inside the key and extending between left and right side walls of the key in the left-right direction; and two left and right guide walls provided inside the key and extending forward a predetermined length from the rib wall with a predetermined spacing therebetween in the left-right direction, and wherein the keyboard chassis includes a plurality of key guides each provided on a key-by-key basis such that each key guide protrudes upward, each key guide being inserted between the two guide walls of each associated one of the keys from below and also brought into sliding contact with the two guide walls.

2. The key guide structure according to claim 1, wherein the rib wall is provided at a predetermined location of a front portion of the key, and wherein the two guide walls are provided at a predetermined distance from a front wall of the key.

3. The key guide structure according to claim 2, wherein front ends of the two guide walls are formed such that the front ends are bent in opposite directions away from each other in the left-right direction.

* * * * *